July 7, 1964 J. B. GROENEWEGEN 3,140,029
TAPE GUIDANCE SYSTEM
Filed July 2, 1962

INVENTOR.
JOHANNES B. GROENEWEGEN
BY Christie, Parker & Hale
ATTORNEYS.

United States Patent Office 3,140,029
Patented July 7, 1964

3,140,029
TAPE GUIDANCE SYSTEM
Johannes B. Groenewegen, San Dimas, Calif., assignor to Consolidated Electrodynamics Corporation, Pasadena, Calif., a corporation of California
Filed July 2, 1962, Ser. No. 206,634
9 Claims. (Cl. 226—88)

This invention relates to tape transport systems and more particularly is directed to an improved tape guidance system.

The use of magnetic tapes to record information is well-known. In conventional systems the tape transport consists of two rotatable hubs, each containing a reel adapted to hold the magnetic tape. The tape is unwound from one reel and passed adjacent a magnetic transducer for either reading or recording information on the tape. The tape is then wound on the other reel by various conventional means which provide for the rotation of the hub to which the reel is attached.

The magnetic tape generally available for use is not uniformly straight, and has a straightness variation, often called "snakiness." If a length of magnetic tape is placed upon a flat surface, it will be found that even though the edges are equally spaced along the length of the tape, such edges themselves do not define a straight line. This deviation occurs as a result of manufacturing processes, and follows a regular pattern. Points of maximum deviation from straightness are found to be spaced at equal distances along the tape. The maximum deviation from a straight line of the tape edge is of the order of from 0.002 to 0.0025 inch. Although the distance between adjacent points of maximum deviation along the length of the tape will vary according to the manufacturer of the tape, such distance is ordinarily on the order of several inches.

Using conventional tape guidance means, as the tape is passed over the magnetic transducer head, the tape may be slightly skewed from the normal path. This occurs because the tape is ordinarily guided past the transducer by guide pins. The pins are mounted transverse to the path of movement of the tape and are spool-shaped. Since the guide pins have a very small area of contact with the tape edges, the tape shifts laterally with movement of the tape over the guide pins as a result of the non-straight edges. Furthermore, at points of maximum deviation from straightness, the edge of the tape is pushed strongly against the adjacent flange of the spool-shaped guide pin. Since the area of contact between the tape edge and the flange is small, there is a large force per unit area applied against the tape edge which results, in many cases, in the additional problem of damage to the edges of the tape from curling and excessive wear.

In order to provide for the rapid recording or reading of digital information in particular, the tape may be passed adjacent the magnetic transducer at a comparatively high rate of speed. Utilizing a high rate of speed enables a large number of information bits to be recorded or read in a comparatively short period of time. The binary bits comprising a word are recorded as magnetized spots across the width of the magnetic tape in one system of recording. In order to insure that all bits in the same word are read simultaneously and only a single word is read at a single instant, the length of a magnetized section on the tape corresponding to a bit is made comparatively long. Therefore, even though the tape may pass the transducer in a skewed position, the length of the bit and the separation between words serially recorded on the tape compensates somewhat for the skewing. This procedure, which necessitates a high tape transport speed in order to process a large quantity of information in a short period of time, requires that a large quantity of tape be utilized in conjunction with a comparatively small amount of information.

However, there are an increasing number of applications wherein a very high degree of accuracy is required, and in such applications tape skewing ordinarily results in unsatisfactory performance. For example, many tracks, or channels, may be closely spaced in order to increase the amount of information upon a given length of tape. In other installations low tape transport speed, shot bit length and narrow word spacing may be utilized. These processes also result ordinarily in unsatisfactory performance of the mechanism, due to the skewing of the tape.

According to the present invention, a novel guidance system is provided which greatly reduces the amount of skew of the tape as it passes the magnetic transducer. By utilizing the novel guidance mechanism, greatly increased accuracy and information storage capacity is achieved for a given length of tape, as compared to conventional practice.

Briefly, this invention provides means for guiding the tape along an elongated arcuate path of movement preceding passage of the tape past the magnetic transducer, such arcuate path providing great lateral stiffness to the tape in order to enable the edges to resist curling. At least one flat edge-engaging guide surface is disposed along the arcuate path of motion of the tape, and means are provided for urging the adjacent edge of the tape against the flat guide surface. The arcuate path of motion and the guide surface must be of a length at least as great as the distance separating two consecutive points of maximum straightness deviation along the adjacent tape edge so there is always one such point along the adjacent tape edge in contact with the guide surface. The tape is thereby carried along a path of motion in a straight line defined by the points of maximum deviation contacting the flat guide surface, and passes the magnetic transducer without skewing.

This invention will be more clearly understood with reference to the accompanying drawings in which.

Figure 1:
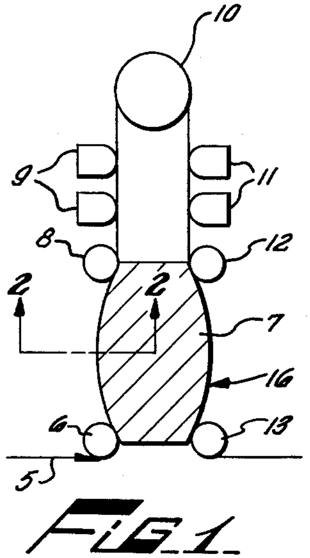
FIG. 1 is a schematic plan view of a portion of a tape transport system having a tape guidance system in accordance with the present invention.

Referring now to the drawings, FIG. 1 illustrates a portion of an otherwise conventional tape transport system equipped with a tape guide according to the present invention. An elongated strip of magnetic tape 5 moves in the direction of the arrow from a supply reel (not shown) past idler rollers 6 and 8. A tape guide 7 is disposed between idler rollers 6 and 8, and has an arcuate side, indicated generally at 15, arranged to engage the adjacent side of the magnetic tape 5 for guiding it along an arcuate path of movement. Idler rollers 6 and 8 are arranged to hold the tape 5 in contact with the arcuate side 15 of the tape guide 7. Rollers 6 and 8 and arcuate side 15 may be referred to as first arcuate guide means. The magnetic tape 5 then passes one or more magnetic transducers 9. In certain conventional magnetic recording devices, the magnetic tape 5 passes around a roller 10 and further magnetic transducers 11. After passing the magnetic transducers 11, the magnetic tape 5 may, for improved guidance, be again carried past a pair of idler rollers 12 and 13 adjacent the tape guide 7 and thereby engaged with a second arcuate side, indicated generally at 16, identical to the first side 15 of the tape guide 7, and may be referred to as second arcuate guide means. The magentic tape 5 is then passed to a take up reel (not shown).

Figure 2:
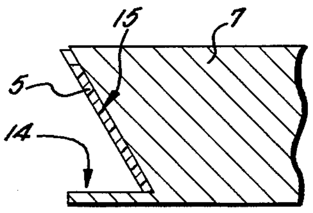
FIG. 2 is a partial cross-section view along lines 2—2 of FIG. 1 of a tape guide in accordance with the present invention.

A preferred embodiment of the present invention is illustrated in FIG. 2. The tape guide 7 has an arcuate side 15 held in contact with the surface of the magnetic tape 5. Arcurate side 15 is tapered and idler rollers 6 and 8 are arranged to urge the tape 5 against the tapered arcuate side 15, thereby urging the adjacent edge of the magnetic tape 5 against an elongated flat guide surface 14 disposed adjacent the arcuate side 15. A second arcuate side 16 and a flat guide surface adjacent thereto (not shown), identical to side 15 and guide surface 14, may be disposed in the position of arcuate side 16 as shown in FIG 1.

It is not necessary that the arcuate side 15 be tapered when only a single guide surface 14 is utilized, and other suitable means may be provided for urging the adjacent edge of the magnetic tape 5 against the guide surface 14.

Figure 3:
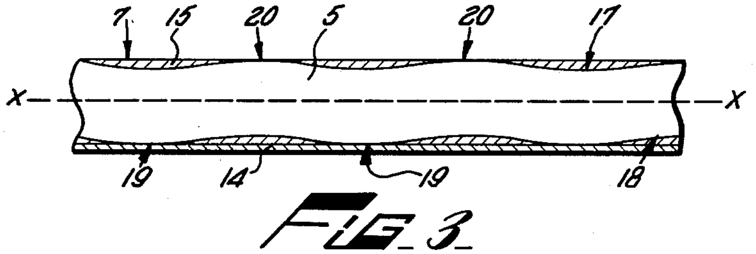
FIG. 3 is a side view of the tape guide shown in FIG. 2.

Conventional magnetic tape is not perfectly straight, as illustrated in FIG. 3, wherein the deviation from straightness of a length of tape 5 is exaggerated for purposes of illustration. Although the top edge 17 and the bottom edge 18 of the magnetic tape 5 are substantially parallel, they are not straight. For any given length of magnetic tape 5 there are a plurality of regular and opposite straightness deviations, giving a wave-like appearance to the tape 5 which may be referred to as "snakiness." In FIG. 3, line X—X is a line along the approximate midsection of the tape 5 and is parallel to the flat guide surface 14. If the path of movement of the midsection of the tape 5 diverts from passage along projection of the stright line X—X, it may be termed "skewed." Due to the regular cylical nature of the straightness deviations, there will be a plurality of regularly spaced points of maximum deviation along each edge of the tape 5. For example, the points of maximum straightness deviation along the first edge 17 of the tape 5 are indicated generally at 20, and the points of maximum deviation of the second edge 18 are indicated generally at 19.

Each arcuate side 15 or 16, together with the flat guide surface adjacent thereto, is of a length at least as great as the distance between two consecutive points of maximum straightness deviation along the adjacent tape edge. For example, if the tape 5 with which the tape guide 7 is to be used has a distance of eight inches between points of maximum deviation from straightness, then the arcuate side 15 and adjacent guide surface 14 must be at least eight inches in length. Additional length is desirable, but not required for satisfactory performance.

When the second edge 18 of the tape 5 is urged against the flat guide surface 14, as illustrated in FIGS. 2 and 3, while the tape is simultaneously bowed due to its contact with arcuate side 15 of guide 7, sufficient lateral stiffness is provided in the tape 5 so that the points of maximum straightness deviation 19 of the edge 18 resist curling and guide the tape. Thereby only points 19 along the edge 18 are engaged with the flat guide surface 14. The flat guide surface 14 is of a length at least as great as the regular distance between two points of maximum straightness deviation 19 along the adjacent edge 18 of the tape 5, and thus at least one point 19 of the edge 18 contacts the guide surface 14 at all times. The tape 5 is thereby maintained in a path of motion parallel to the guide surface 14, so that its average midsection travels in a straight line along line X—X.

It is therefore a feature of the present invention that arcuate sides 15 or 16 of the tape guide 7 are continuously curved in order to provide maximum lateral tape stiffness. This provides more satisfactory performance than, for example, urging the tape against a series of guide posts disposed at points along an arc. Such guide posts would provide a series of straight-line segments of tape, rather than the desired continuous curvature. It has been found that the degree of curvature of the arcuate sides 15 or 16, and therefore of the arcuate path of motion of the magnetic tape, is not critical, the only requirement being that sufficient curvature be introduced to cause lateral stiffness in the tape, and that the arcuate path of motion continue for a sufficient distance to accommodate an adjacent flat guide surface of the required length as specified above.

Because the magnitude of straightness variations within the length of tape adjacent the tape guide 7 is normally greater than that of any tape width variations within such length, the compensation for straightness variation provided by the flat guide surface of the present invention has the added advantage of virtually eliminating the possibility of skewing caused by tape width variations.

Figure 4:
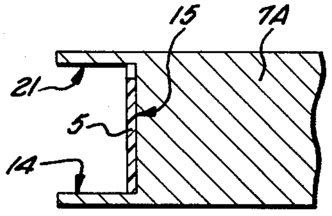
FIG. 4 is a partial cross-section view of another embodiment of the tape guide shown in FIG. 2.

Referring now to FIG. 4, another embodiment of the present invention is shown. In this embodiment, the tape guide 7A is identical to tape guide 7 of FIGS. 1 and 2, except that a second elongated flat guide surface 21 is disposed parallel to the first guide surface 14 so that the magnetic tape 5 passes between guide surfaces 14 and 21, and its arcuate side 15A is not tapered. Guide surfaces 14 and 21 are separated by a distance only slightly greater than the maximum width of the magnetic tape 5, in order to guide the magnetic tape 5 therebetween. Two flat guide surfaces (not shown) corresponding to first and second guide surfaces 14 and 21 may also be disposed adjacent the second arcuate side 16 of the tape guide 7. The added guide surface eliminates the necessity for separate means urging the tape edge against a single guide surface.

The essence of the invention in the tape guidance system lies in the use of a flat guide surface of the required length disposed adjacent at least one edge of tape which is arcuately positioned for lateral stiffness, to reduce the skewing of the tape adjacent the magnetic transducer. For certain applications or tolerances of tape, modifications of the apparatus disclosed herein may be found to be advantageous. It is, therefore, to be understood that the particular apparatus described herein is intended to be primarily a guide in the practice of the invention, rather than to constitute an unnecessary limitation.

The invention claimed is:

1. A tape guidance system for use in reducing the skewing of magnetic tape adjacent a magnetic transducer, the magnetic tape being of the class having a plurality of points of maximum straightness deviation disposed at regular intervals along the length thereof, comprising:

(*a*) arcuate guide means adapted to engage one surface of the magnetic tape for guiding the tape along an arcuate path of motion preceding its passage past a magnetic transducer, (*b*) an elongated flat guide surface disposed adjacent the arcuate guide means and arranged to engage one edge of the portion of the magnetic tape disposed along the arcuate path of motion, (*c*) the flat guide surface and the arcuate guide means extending along the path of motion of the magnetic tape for a distance at least as great as the distance between two consecutive points of maximum straightness deviation along the edge of the magnetic tape adjacent the flat guide surface, and (*d*) means for urging the adjacent edge of the magnetic tape against the flat guide surface.

2. A tape guidance system according to claim 1 wherein the arcuate guide means comprises a continuously curved arcuate surface and means for holding the adjacent surface of the tape in contact therewith for bowing the tape to provide lateral stiffness therein.

3. A tape guidance system according to claim 2 wherein the flat guide surface is formed integrally with the arcuate surface.

4. A tape guidance system according to claim 3 wherein the means for urging the adjacent edge of the tape against the flat guide surface comprises a tapered arcuate surface inclined toward the adjacent flat guide surface at an acute angle thereto.

5. A tape guidance system for use in reducing the skewing of magnetic tape adjacent a magnetic transducer, the magnetic tape being of the class having a plurality of points of maximum straightness deviation disposed at regular intervals along the length thereof, comprising:

(*a*) arcuate guide means adapted to engage one surface of the magnetic tape for guiding the tape along an arcuate path of motion preceding its passage past the magnetic transducer, (*b*) means providing first and second elongated flat guide surfaces, each flat guide surface being disposed adjacent the arcuate guide means and arranged to engage one edge of the portion of the magnetic tape disposed along the arcuate path of motion, said guide surfaces being spaced apart in parallel relationship to one another, and (*c*) each flat guide surface and the arcuate guide means extending along the path of motion of the magnetic tape for a distance at least as great as the distance between two adjacent points of maximum straightness deviation along the adjacent edge of the magnetic tape.

6. A tape guidance system according to claim 5 wherein the arcuate guide means comprises a continuously curved arcuate surface and means for holding the adjacent surface of the tape in contact therewith for bowing the tape to provide lateral stiffness therein.

7. A tape guidance system for use in reducing the skewing of magnetic tape adjacent a magnetic transducer, the magnetic tape having a plurality of points of maximum straightness deviation disposed at regular intervals along the length thereof, comprising:

(*a*) first arcuate guide means adapted to engage the side of the magnetic tape for guiding the tape along a first arcuate path of motion preceding its passage past a magnetic transducer, and second arcuate guide means substantially identical to the first arcuate guide means for guiding the magnetic tape along a second arcuate path of motion following its passage past the magnetic transducer, (*b*) first and second elongated flat guide surfaces, one of the flat guide surfaces being disposed adjacent each of the first and second arcuate guide means and arranged to engage at least one edge of the portion of the magnetic tape disposed along an arcuate path of motion, (*c*) each flat guide surface and each arcuate guide means extending along the path of motion of the magnetic tape for a distance at least as great as the distance between two consecutive points of maximum straightness deviation along the edge of the magnetic tape adjacent the flat guide surface, and (*d*) means for urging the adjacent edge of the magnetic tape against each flat guide surface.

8. A tape guidance system comprising means defining a smooth continuous surface, the surface being curved in an arc along the long dimension thereof, means for guiding the tape into contact with said surface with the path of movement of the tape being in the direction of the arcuate long dimension of the surface, whereby the tape is directed along an arcuate path as it is fed through the guidance apparatus, and means defining a planar surface extending outwardly from the arcuate surface for engaging one edge of the tape as it passes over the arcuate surface.

9. A tape guidance system comprising a guidance element having first and second smooth continuous surfaces on opposite sides of the element, means for directing the tape in a loop across the first surface and back across the second surface, the first and second surfaces each being curved in a convex arc along the long dimension thereof, and means forming flat surfaces projecting beyond each of the curved surfaces along the extent of the arcs to provide tape edge positioning surfaces, the tape edge positioning surfaces associated with two tape guiding surfaces lying in a common plane.

References Cited in the file of this patent

UNITED STATES PATENTS

| | | |
|---|---|---|
| 2,862,715 | MacDonald | Dec. 2, 1958 |
| 2,916,228 | Wellington | Dec. 8, 1959 |
| 2,988,294 | Neff | June 13, 1961 |